May 5, 1964
R. NEWHOUSER
3,131,946
DRAW-BAR ACTUATED CENTERING DEVICE
Filed Jan. 2, 1962
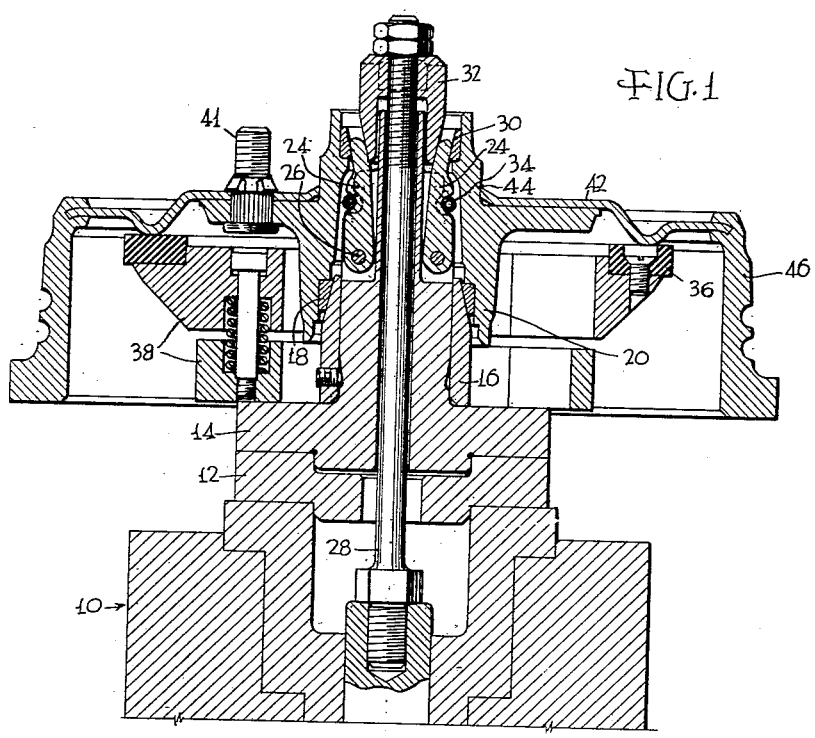
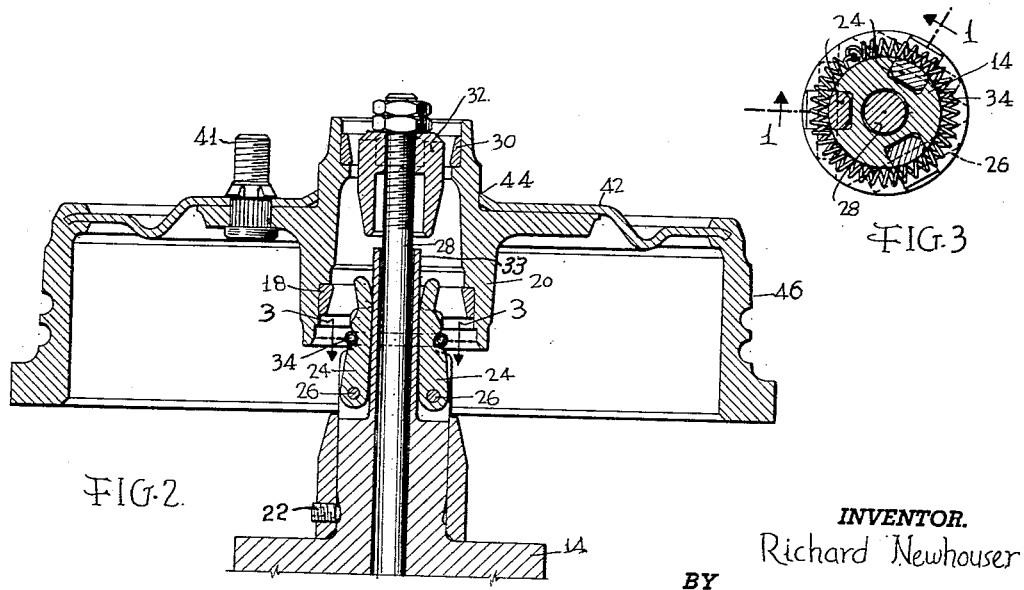
INVENTOR.
Richard Newhouser
BY John B. Sowell
ATTORNEY May 5, 1964  R. NEWHOUSER  3,131,946
DRAW-BAR ACTUATED CENTERING DEVICE
Filed Jan. 2, 1962  2 Sheets-Sheet 2
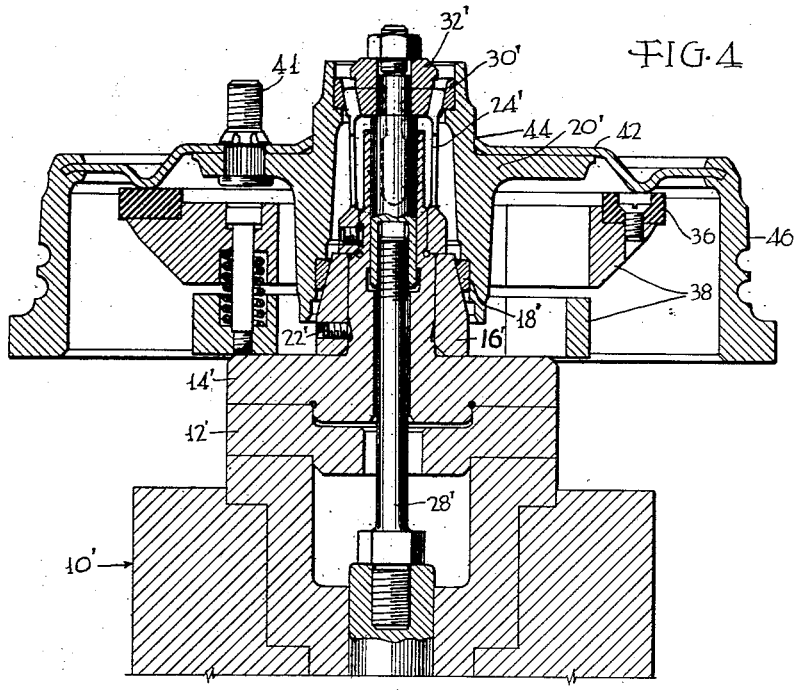
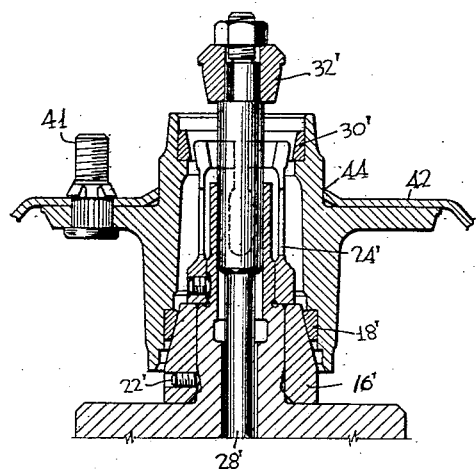
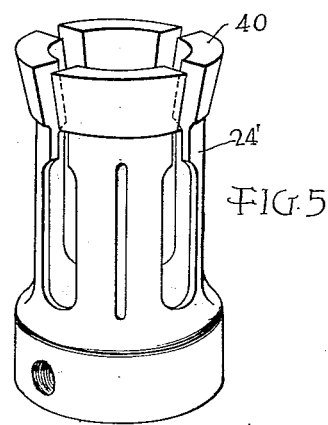
INVENTOR.
Richard Newhouser
BY John B. Sowell
ATTORNEY

United States Patent Office 3,131,946
Patented May 5, 1964

3,131,946
DRAW-BAR ACTUATED CENTERING DEVICE
Richard Newhouser, Detroit, Mich., assignor to The Budd Company, Philadelphia, Pa., a corporation of Pennsylvania
Filed Jan. 2, 1962, Ser. No. 163,615
5 Claims. (Cl. 279—2)

This invention relates to chucking devices and more particularly to a positioning and centering collet structure for an improved chucking device.

Brake drums of automobiles comprise basically a formed steel circular disc and an iron muff or drum which is cast integrally connected to the disc. The drum is later connected to a hub by means of well known wheel studs.

Heretofore, hollow cylindrical objects such as brake drums for automobiles were machined by clamping the external surfaces of the brake drum in the jaws of a conventional chuck such as those shown and described in U.S. Patent No. 2,669,458.

It has been a problem among brake drum manufacturers to center the brake drum for machining when there is no machined surface to center upon. Improvements in the art of casting have provided better cast surfaces for the chuck jaws, but even this does not insure the manufacturing accuracy presently required.

It has become necessary to provide a means for obtaining brake drums that are in true round with the bearing surface of the hubs, and to facilitate the use of existing machine tools to obtain extremely high manufacturing accuracy.

The principal object of this invention is to provide an expanding collet structure operable by a draw-bar.

It is another object of the present invention to provide a self-centering collet structure for positioning and clamping the machined inside surfaces of an irregular shaped object.

Another object is to provide a collet having inwardly urged spring loaded fingers forming a split ring having internal and external smooth bearing surfaces.

Another object is to provide means for centering wheel-hub-brake drum assemblies on a draw-bar machine tool.

Another object is to eliminate chucking devices and to provide a more accurate method of machining brake drums.

The above and other objects and novel features of the invention will become apparent from the following description and accompanying drawings in which:

FIG. 1 is a cross-sectional elevation of the spring urged collet structure actuated by a draw-bar to position a brake drum and hub;

FIG. 2 is a cross-sectional elevation of the spring urged collet structure prior to actuation of the draw-bar;

FIG. 3 is a section cut along lines 3—3 of FIG. 2;

FIG. 4 is a cross-sectional elevation of a modified collet structure similar to FIG. 1;

FIG. 5 is a detail in perspective of the spring urged fingers of the modified collet structure of FIG. 4;

FIG. 6 is a partial cross-section of the modified collet structure of FIG. 4 shown prior to actuation of the draw-bar.

In accordance with the present invention there is provided a centering and positioning structure comprising, a pilot mandrel mounted on a spindle base, a draw-bar slidably mounted through the center of said spindle base, spring actuated collet fingers forming a split ring mounted on said base, said fingers being spaced equidistant from the central axis of said draw-bar and being spring urged toward the center of said draw-bar, and a conical cap mounted on the end of said draw-bar being slidably engageable with the inner surface of said split ring on said fingers to urge the outer surface of said split ring of said fingers into engagement with an inner surface of an object to be machined.

My improvement is usually actuated by the axial movement of a draw-bar similar to a draw-bar actuator employed in multiple spindle machines made by The Bullard Company, which are typical of draw-bars embodied in many types of machine tools.

Referring to FIGS. 1 to 3, the invention is shown mounted on a spindle head 10 by means of an adapter plate 12. Pilot mandrel 14 is provided with a guide sleeve 16 for engagement with an inner bearing race 18 of the wheel hub 20. A set screw 22 permits the interchange of guide sleeves 16 which are subject to wear or replacement for different wheel hubs 20. The upper portion of mandrel 14 is slotted to provide recesses for collet fingers 24 pivotable on pivot pins 26 set in the mandrel 14, and terminates at the upper end in a sleeve concentric with the draw-bar extension 28.

As shown in FIG. 1, a conical actuator cap 32 mounted on draw-bar 28 fits over the upper sleeve 33 of mandrel 14 and urges the fingers 24 outward into engagement with the outer bearing race 30 of wheel hub 20. Fingers 24 are actuated after wheel hub 20 is positioned on sleeve 16 of pilot mandrel 14 so there is very little wear between the fingers 24 and the outer bearing race 30. Wear that does occur between cone 32 and fingers 24 is not critical for the draw-bar may be pressure actuated and/or adjustable.

In the actuated position spindle 10, adapter 12, mandrel 14 and sleeve 16 form a rigid body for the support of hub 20 which is centered and positioned by the fingers 24 rigidly held between conical cap 32 and outer bearing race 30. To avoid any slippage at the bearing races during a machining operation a conventional drive crank (not shown) is connected to the drive spindle to engage a stud or stud hole and insure a positive drive between the drive spindle and the wheel hub 20.

In the released position, or prior to actuation, as shown in FIG. 2, the draw-bar 28 is raised to disengage the fingers 24 allowing circular spring 34 to urge the fingers 24 into the recesses provided in pilot mandrel 14. In the recessed position fingers 24 clear outer bearing race 30 permitting removal of a machined drum or placement of a drum to be machined upon the centering structure.

The centering structure described avoids completely three types of errors that occur when chucking devices are employed. Chuck jaws bite into the object varying amounts thus shifting the true center of a brake drum; chucking the outside surface of a brake drum, especially a rough cast surface, cannot insure that a wheel hub will be affixed at true center; and chucking devices are subject to point contact wear which inevitably causes changes in centering.

Manufacturing tolerances have heretofore been limited by the accuracy of centering the workpiece. The novel centering device centers on machined or bearing surfaces insuring both radial and axial alignment. These bearing surfaces do not transmit rotational forces and are not subject to torsional driving stress, thus, will maintain their accuracy for long periods. The device eliminates chuck jaws and costly down time of machine tools for chuck jaw replacement.

A modified embodiment of the centering structure is shown in FIGS. 4 to 6. An anti-chatter cushion 36, supported by a raised step plate 38, is shown contacting a portion of the brake drum disc. This feature prevents vibration or chatter of the drum that may occur when high speed alloy cutting tools take a deep cut from the drum. The aforementioned drive crank (not shown) may also be incorporated into the raised step plate 38 as a means of providing a rigid drive connection from the spindle to the brake drum.

In FIG. 4 the spindle head 10' and adapter plate 12' are the same as those shown in FIG. 1. The pilot mandrel 14', guide sleeve 16' and collet fingers 24' have been modified to illustrate an arcuate shaped split bearing ring 40 extending from the fingers 24'. The embodiment shown in FIGS. 4 to 6 is preferably made of spring steel to eliminate the spiral coil spring 34 although the arcuate shaped split bearing ring 40 could well be adapted to the spring urged pivotal fingers 24.

FIG. 5 illustrates in perspective detail a preferred one piece structure of the collet fingers. The fingers are preferably slotted to provide better flexibility. A thin wall finger section has proven adequate for there are no torsional stresses imposed on the bearing collet as would occur in the case of a gripper collet.

In actual manufacturing practice cylindrical objects, such as the brake drum shown, are preferably machined on multiple spindle machines which have a plurality of work stations enabling several different machining operations. The brake drum may require a rough cut, a semi-finish cut, and a honing operation. These operations could be made by chucking the outside surface of the drum, but as explained hereinbefore, this method is not sufficiently accurate. The drum could be machined on a lathe having a head stock and a tailstock, but this would require individual loading operations and/or the design of specialized equipment.

The centering collet structure is adaptable to multiple spindle machine tools and provides a structure for converting draw-bar actuated chucking machines to inside centering and axial positioning machines.

FIGS. 4 and 6 show a threaded stud 41 which has been staked or upset at the base of the thread adjacent the disc 42 of the drum 44. Original equipment for automobiles requires both a brake drum and wheel hub. It has been found desirable to stake the splined stud into the wheel hub 20 and affix the drum and disc semi-permanently thereto by staking the base of the thread. This allows the drum and disc to be separated in the field from the hub by filing away the upset metal of the stud at the base of the thread if a replacement drum should be required. When a replacement drum and disc is machined it does not require a hub and the mandrel 14 may be modified to have a shape similar to the outer surfaces of the wheel hub 20. The pivotal collet fingers are then mounted in recesses of the mandrel and spring urged toward the draw-bar. It can be seen with reference to FIG. 1 that the correct placement of the pivotal fingers would cause the fingers to grasp the top of the disc 42 at the central aperture 44 to perform both a centering and axial alignment operation as well as holding the drum and disc against axial forces incurred during machining.

It is apparent that many modifications to the shape of the mandrel and pivotal fingers may be made to accommodate varied workpieces having irregular shaped center openings without departing from the spirit and scope of this invention, the specific embodiments described are given by way of example only and the invention is limited only by the terms of the appended claims.

What I claim:

1. A draw-bar actuated device for centering and positioning a hollow object having radially and axially internally disposed seating surfaces, comprising, a pilot mandrel mounted on a spindle base, a draw-bar slidably mounted through the center of said pilot mandrel and spindle base, a tapered sleeve bearing surface on the base of said mandrel for supporting engagement with a first seating surface in said hollow object, a plurality of collet fingers pivotally mounted in recesses on said mandrel, spring means cooperating with said fingers to urge them inwardly into said recesses in said mandrel, said fingers being mounted radially equidistant from the center of said mandrel, and a conical actuating cap fitted to an end of said draw-bar for urging said fingers outwardly into engagement with a second seating surface in said hollow object to provide radial and axial alignment of said hollow object.

2. A draw-bar actuated device according to claim 1, which further includes a raised tubular sleeve on said mandrel fitted concentrically around said draw-bar for engagement with a cylindrical recess in said conical actuating cap.

3. A draw-bar actuated device for centering and positioning a hollow body of revolution comprising, a pilot mandrel having a hollow cylindrical center, a cylindrical draw-bar slidably mounted for vertical actuation through said center of said mandrel, a first bearing surface on said mandrel for engagement with a radially and axially inclined lower bearing surface inside said body, spring urged collet fingers having radially and axially inclined end portions mounted on said mandrel above said first bearing surface, said fingers being urged radially inward toward said mandrel to provide clearance for removal of said body, and a conically shaped cap mounted on said draw-bar for vertical movement therewith, said vertical movement of said cap causing engagement with an inner inclined surface of said fingers to urge the outer surface of the end portions of said fingers into engagement with an upper bearing surface on said hollow body whereby axial and radial alignment of said object is achieved by centering and clamping on two axially separated bearing surfaces on said hollow body.

4. A draw-bar device according to claim 3, which further includes a tapered sleeve on said mandrel to provide said first bearing surface.

5. A draw-bar device according to claim 4, which further includes a split ring attached to said fingers to provide the bearing surfaces for said fingers.

References Cited in the file of this patent

UNITED STATES PATENTS

| | | |
|---|---|---|
| 2,394,841 | Bugg | Feb. 12, 1946 |
| 2,922,657 | Garrison | Jan. 26, 1960 |
| 2,949,313 | Moser | Aug. 16, 1960 |
| 3,026,115 | Brauer | Mar. 20, 1962 |